United States Patent [19]

Fukae et al.

[11] Patent Number: 4,758,862
[45] Date of Patent: Jul. 19, 1988

[54] ELECTROGRAPHIC PRINTER/COPIER WITH DUPLEX PRINTING

[75] Inventors: Kensuke Fukae, Monsey, N.Y.; Shozo Kaieda, Nagano, Japan

[73] Assignee: Kentek Information Systems, Inc., Allendale, N.J.

[21] Appl. No.: 39,464

[22] Filed: Apr. 16, 1987

[51] Int. Cl.$^4$ ............................................. G03G 21/00
[52] U.S. Cl. .................... 355/3 SH; 355/24; 355/26; 355/64
[58] Field of Search .................. 355/3 SH, 23, 24, 26, 355/64, 65, 14 SH

[56] References Cited

U.S. PATENT DOCUMENTS

| | | | |
|---|---|---|---|
| 4,362,379 | 12/1982 | Tiek et al. | 355/3 SH |
| 4,536,078 | 8/1985 | Ziehm | 355/3 SH |
| 4,542,976 | 9/1985 | Kasamura | 355/3 DR |
| 4,573,789 | 3/1986 | Wada | 355/3 SH |
| 4,586,640 | 5/1986 | Smith | 355/3 SH |
| 4,634,264 | 1/1987 | Takahashi | 355/16 |
| 4,650,313 | 3/1987 | Koike | 355/3 SH |
| 4,664,507 | 5/1987 | Fukae et al. | 355/3 SH |
| 4,692,020 | 9/1987 | Tsujihara | 355/3 SH |

Primary Examiner—R. L. Moses
Attorney, Agent, or Firm—Marmorek, Guttman & Rubenstein

[57] ABSTRACT

An electrographic printing apparatus capable of duplex printing comprises a housing, a source of copy material and an output tray for receiving such copy material after it is imprinted, and a photoconductive member for storing a latent electrostatic image of the information to be imprinted. The printer/copier has first and second paper paths located near the top of the housing so that access to the paper may be achieved from the top of the housing. A photoconductive member is located below the first paper path and comes into contact with a first side of the paper from below in a transfer zone located in the first paper path to imprint the first side of the paper. The second paper path is operative to receive paper after it has passed through the transfer zone and information has been transferred to the first side of the paper. As the paper travels along the second paper path, it is turned over and then returned to the first paper path prior to the transfer zone so that the second side of the paper is imprinted from below by the photoconductive member.

27 Claims, 2 Drawing Sheets

ELECTROGRAPHIC PRINTER/COPIER WITH DUPLEX PRINTING

BACKGROUND OF THE INVENTION

This invention relates to an electrographic printer or copying machine having a simplified paper path, and which is capable of printing on both sides of a sheet of paper. More specifically, the present invention relates to an electrographic printer or copying machine which employs a vertically mounted photoconductive belt assembly for printing on one side of a sheet of paper as it passes over the photoconductive belt, and which is capable of recycling the paper to print on the other side of the sheet of paper as it passes over the photoconductive belt a second time.

In the process of electrographic or xerographic printing, a photoconductive member is employed to record an image. The photoconductive member, which may be in the form of a belt or a drum, is charged to a substantially uniform potential to sensitize its photosensitive surface. In the case of a copying machine, a light is shined on an original document to be copied. Through the use of lenses, mirrors, and various other optical components, the charged portion of the photoconductive surface is exposed to a reflected light image of an original document to be reproduced. The light image is recorded as an electrostatic latent image on the photoconductive member. This latent image corresponds to the informational areas contained on the original document.

In the case of an electrographic printer connected to a computer, a similar process is used to record information on the photoconductive member. The charged portion of the photoconductive surface is exposed to a light image produced by an optical print head. The precise shape of the light image is controlled by input signals from the computer. For example, a laser or an LED array may be used as an optical print head which receives input signals from the computer to illuminate the photoconductive member with a light image of a particular shape. Here too, an electrostatic latent image corresponding to the desired informational areas is recorded on the photoconductive member.

As used herein, the term "electrographic printing apparatus" and the like refer to both electrographic printers and copiers.

After recording the electrostatic latent image on the photoconductive member, the latent image is developed by bringing a developer material or toner into contact with it. The developer material is attracted to the electrostatic latent image and forms a powder image on the photoconductive member corresponding to the electrostatic latent image. The powder image is subsequently transferred to a sheet of recording medium, such as a sheet of paper, in a transfer region. Thereafter, the powder image is permanently affixed to this sheet in image configuration by a variety of methods, such as by fusing.

The above-mentioned operations may be carried out by arranging a number of stations in sequence about the photoconductive member. Thus, the photoconductive member is usually surrounded in sequence by a charging station to charge the photoconductive member, an imaging station to form an electrostatic latent image on the photoconductive member, a developing station to develop the electrostatic latent image on the photoconductive member, and a transfer station to transfer the developed image from this photoconductive member to the sheet of recording medium. A discharging station and a cleaning station are also arranged about the photoconductive member to ready it for use again.

An example of such an electrographic printing apparatus is disclosed in allowed application Ser. No. 700,813, filed Feb. 11, 1985, now U.S. Pat. No. 4,664,507. The electrographic printer/copier described in that patent application employs a photoconductive belt assembly in the form of a disposable cassette which is the subject of allowed application Ser. No. 718,947, filed Apr. 2, 1985. The printer/copier described in application Ser. No. 700,813 also employs the combined developing and cleaning unit which is the subject of allowed application Ser. No. 718,946, filed Apr. 2, 1985, now U.S. Pat. No. 4,639,116. All of the aforementioned patent applications are assigned to the present assignee and all are incorporated herein by reference.

The electrographic printer/copier described in application Ser. No. 700,813 has a simplified paper path permitting access from the top of the machine. In that electrographic printer/copier, the cassette containing the photoconductive belt is mounted vertically within the machine and a latent image is developed on the underside of the copy sheet as it passes over and comes in contact with the top of the photoconductive belt assembly.

The electrographic printer/copier described in that application requires two rotations of the photoconductive belt per copy produced. In actual practice, it is capable of producing about 12 copies per minute. During the first rotation of the photoconductive belt, the belt is uniformly charged and a latent image is generated by means of an optical print head on the surface of the photoconductive belt. The latent image thus formed is developed by the deposition of toner from a combined developer/cleaning unit operating in the develop mode. The belt then enters the transfer region wherein the developed image is transferred to the underside of the paper or other copy material. In the transfer region, a transfer unit generates an electrical field which attracts the toner from the photoconductive belt to the underside of the paper. This completes the first rotation of the belt as the paper travels to a fuser unit and is discharged into the output tray.

During the next revolution of the belt, the belt is prepared for making the next copy. The main charging unit and the optical print head are disabled while an erase lamp is activated and the developer/cleaner unit is switched to the clean mode. Thus, as the belt continues to rotate following image transfer, the photoconductive belt is discharged by an erase lamp and the excess toner is removed using a conventional electrostatic process by the developer/cleaner unit. The belt is thereby readied for printing on the next page.

One of the primary objects of the electrogaphic printer/copier described in application Ser. No. 700,813 is to provide a machine which is reliable over an extended period of use and which is easily serviceable. To accomplish this, the machine is provided with modular units which are easily removed and replaced at specified time intervals or when they malfunction. In addition, the machine is provided with a simplified paper path whereby the paper always travels along a substantially planar path located near the top of the machine. The paper is imprinted on its underside as it travels along this paper path and passes across the top of the vertically mounted photoconductive belt.

By providing this "straight-through" paper path, the number of paper jams is considerably reduced. In the event a paper jam does occur, the lid of the machine can be opened and the jammed paper can be readily accessed from the top of the machine. This is in contrast to prior art machines wherein paper jams can only be accessed from the side of the machine. Additionally, because the paper is imprinted on its underside, and because the machine has a "straight-through" paper path, the paper is ejected into the output tray face down. Thus, the paper is automatically collated as it is being printed and ejected.

One feature that the electrographic printer/copier described in application Ser. No. 700,813 lacks is the ability to perform duplex printing, i.e, the ability to print on both sides of a sheet of paper. Duplex printing is important in many applications, for example, in printing a book or in "desktop publishing" applications.

Another shortcoming of the electrographic printer/copier described in application Ser. No. 700,813 is that it requires two revolutions of the photoconductive belt to print on a side of the paper.

Accordingly, it would be desirable to provide an electrographic printer/copier having a simplified paper path similar to that of the printer/copier described in application Ser. No. 700,813, but which is capable of performing single-sided and duplex printing.

It would further be desirable if the paper path for this duplex printing apparatus were near the top of the machine to provide easy access in case of paper jams.

It would further be desirable if this electrographic printing machine required only a single revolution of its photoconductive member per side of copy material imprinted.

SUMMARY OF THE INVENTION

These and other objects are achieved by means of the present invention which provides an electrographic printing apparatus for producing hard copies of information to be recorded on two sides of a sheet of paper or other copy material. The electrographic printing apparatus comprises a housing open on top, a lid for covering the top of the housing, a source of paper, an output tray for receiving the paper after it is imprinted, and a photoconductive member for storing a latent electrostatic image of the information to be imprinted on the paper. The electrographic printing apparatus includes rollers for guiding the paper along first and second paper paths. The paper travels along the first paper path between the source and the output tray, the first paper path being substantially contained in a single plane located near the top of the housing. The photoconductive member is located below the first planar paper path. It comes in contact with a first side of the paper from below in a transfer zone which is located in the first paper path to transfer the latent electrostatic image to that first side of the paper. The paper travels from source to output tray along the first paper path when single-sided printing is desired. In such case, the paper path of the present printing apparatus is similar to the paper path of the printer/copier described in application Ser. No. 700,813.

The electrographic printing apparatus of the present invention also includes a second substantially planar paper path located near the top of the housing. When duplex printing is selected, the paper is received in the second paper path after it has been imprinted on its first side. The paper is turned over in the second paper path so that its second side becomes its underside. The paper is then returned to the first paper path to pass through the transfer zone once again so that the photoconductive member comes into contact with the second side of the paper from below in order to transfer the latent electrostatic image to the second side of the paper. The paper is then ejected into the output tray with its second side down.

In a preferred embodiment, the electrographic printing apparatus of the present invention includes a paper skew correction station located along the second paper path. The paper enters the paper skew correction station and is realigned prior to being recycled into the first paper path for printing on the other side of the paper.

Preferably, the two paper paths taken together schematically form a loop and a branch extending from the loop. The photoconductive member is located below a first straight portion of the loop. The paper travels along this first straight portion of the loop with a leading edge in front. As it travels along the first straight portion of the loop, the sheet of paper is imprinted from below on a first side. The paper then travels through an area of reversion where it is turned over so that its second side becomes its underside, and enters a second straight portion of the loop. From there, the paper enters the branch with its leading edge first. A paper skew correcting device is located in the branch and the paper is realigned horizontally. Thereafter, the sheet of paper, without being turned over, is returned to the first straight portion of the loop where it is imprinted from below on its second side. This time, the paper travels along this portion of the loop with its previously trailing edge in front. After the paper passes through the transfer zone a second time, it is ejected into the output tray.

In this preferred embodiment of the present invention, the developer/cleaning unit described in the previously mentioned application Ser. No. 718,946 is not employed. Instead, a separate and independent cleaning unit is employed. This cleaning unit is mounted on the photoconductive member so that it is located immediately after the transfer zone. The cleaning unit operates to clean residual developer particles from the photoconductive member after the powder image has been transferred to the paper. By using a separate and independent cleaning unit, the electrographic printer/copier is capable of imprinting a sheet of paper with only a single revolution of the photoconductive member being required per side.

DETAILED DESCRIPTION OF THE PREFERRED EMBODIMENT

Figure 1:
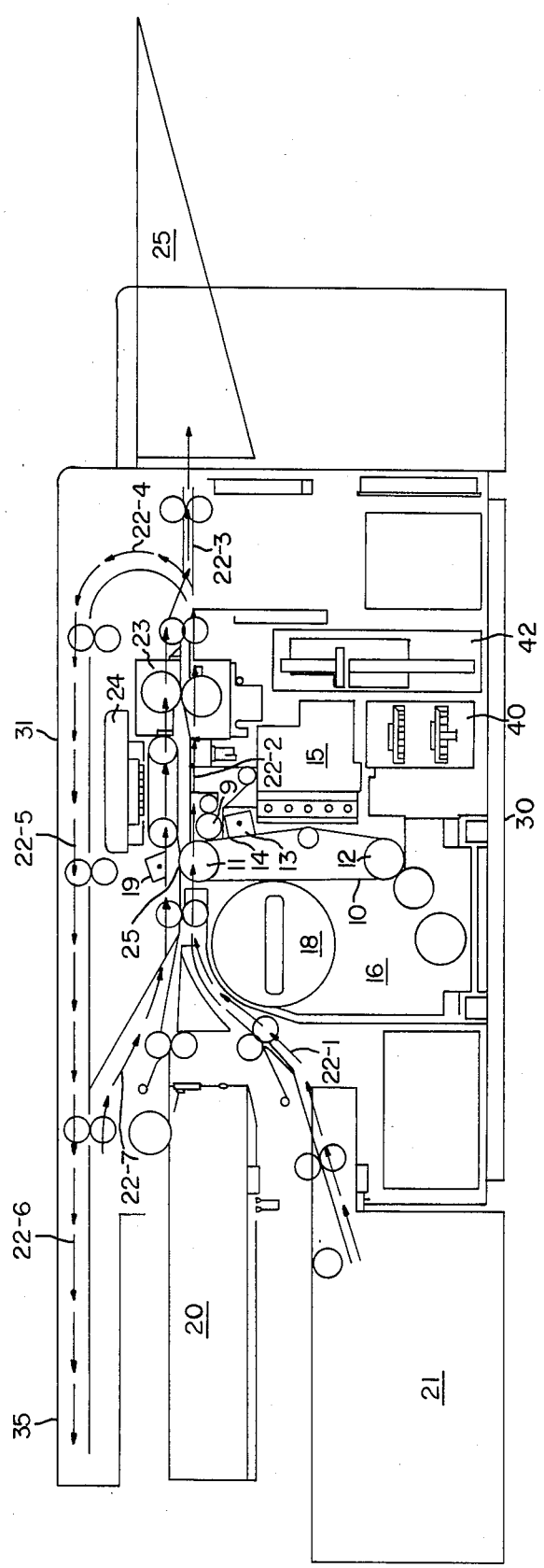
FIG. 1 is a schematic diagram of an electrographic printer in accordance with an illustrative embodiment of the present invention.

FIG. 1 is a block diagram showing the basic components of an electrophotographic printer in accordance with one aspect of the present invention. Such printers typically include a photoconductive member which, in the illustrative embodiment, is photoconductive belt 10. Desirably, the photoconductive member comprises the photoconductive belt assembly in the form of a disposable cassette which is disclosed and claimed in the previously mentioned allowed application Ser. No. 718,947, filed Apr. 2, 1985. As illustrated in FIG. 1, this photoconductive belt assembly is mounted vertically in the electrographic printer. It includes a sheet guiding structure (not shown) at the top of its frame which guides the sheet across its top. The sheet guiding structure defines a horizontal transfer zone 25 of short length below the top of the housing 30 of the printer. Housing 30 includes a top lid 31 which is hinged so that it can be lifted upwardly.

The photoconductive belt rotates clockwise as shown by means of rollers 11 and 12. Located along the right side of the belt, as viewed in FIG. 1, are a cleaning unit 9, erase lamps 14, a main charger 13, and an optical print head 15. On the left side of the belt is the developer unit 16. This unit contains a toner cartridge 18 for convenient handling. Located at the top of the belt path, is a transfer unit 19, which unit creates an electric field to attract toner from the photoconductive belt 10 onto the underside of sheets of paper or other copy material passing through the image transfer region 25. The copy material travels along a paper path which is generally designated with the number 22. As it travels along this paper path, the copy material passes through transfer region 25 where it is imprinted from below.

The novel paper path of the illustrated printer will now be described by reference to the arrows shown in FIG. 1.

The copy material, e.g., paper, is derived from either of two convenient paper handling cassettes 20 or 21. For purposes of explanation, it will be assumed that a sheet of paper with a first side "A" facing down and a second side "B" facing up is supplied by the lower cassette 21 by means of suitable rollers. The paper is first directed along a branch 22-1 of the paper path until it enters a first main portion 22-2 of the paper path, as shown by the lower set of arrows in FIG. 1. Portion 22-2 of the paper path leads the sheet of paper into contact with photoconductive belt 10 in image transfer region 25 located between the upper roller 11 and the transfer unit 19. While the sheet of paper is in transfer region 25, it is imprinted from below onto its underside, in this case side A. From the image transfer region 25, the paper is transported along portion 22-2 of the paper path 22 to a fuser unit 23 by means of a vacuum transport unit 24. In the event duplex printing has not been selected, the paper continues along a branch 22-3 of the paper path and is ejected into output tray assembly 25 with its printed side, side A, face down, thus being automatically collated.

Thus far, the description of the present invention is similar to that for the electrographic printer/copier described in application Ser. No. 700,813. In the event duplex printing is selected, the sheet of paper is not ejected into output tray 25 after it passes through fuser unit 23. Rather, the paper enters an area of reversion 22-4 of paper path 22 where it is turned over so that side B now becomes the underside. The paper then enters second main portion 22-5 of paper path 22. This second main portion 22-5 of the paper path is located immediately below lid 31 of the printer. Being located in such close proximity to lid 31 permits easy access to the sheet of paper as it travels along the paper path in the event of a paper jam.

The sheet of paper next enters a branch 22-6 of paper path 22 where a paper skew correction device 35 is mounted on lid 31. Paper skew correction device 35 mechanically realigns the paper horizontally so that when it is imprinted on its second side, side B, all of the margins will be properly aligned to coordinate with the printing on side A.

After being realigned by paper skew correction device 35, the paper returns to the first main portion 22-2 of paper path 22 via a reversion portion 22-7. This time the sheet travels along portion 22-2 with its second side, side B, as its underside. The paper enters transfer region 25 once again and information is printed on side B of the sheet of paper as it makes contact with the photoconductive belt 10. Next, the printed paper is transported to fuser unit 23 by means of vacuum transfer unit 24 whose only contact now is with side A, the already imprinted and fused side of the paper. The unfused side, side B, does not come in contact with transfer unit 24 thus avoiding smudging on that side of the paper. The fuser unit 23 then fuses the toner onto side B of the paper by applying heat to the paper and the paper is ejected into output tray 25 with side B facing down. Since all of the imprinted paper is received with side B facing down, the paper is automatically collated as it is collected in output tray 25.

It will be observed that as the sheet of paper travels along straight portion 22-2 of the paper path, it travels with a leading edge, for example, the top of the sheet, in front. As the sheet passes through reversionary area 22-4 and enters straight portion 22-5 of the paper path, the sheet is turned over, so that side B becomes the underside. During this portion of the paper path, the sheet is still travelling with the same leading edge in front. It then enters branch 22-6, leading edge first, for realignment. When the sheet leaves branch 22-6 in order to re-enter portion 22-2 of the paper path, however, it does so with its trailing edge, i.e., its bottom edge, in front and with side B as its underside. In other words, the sheet of paper "backs out" of branch 22-6. As a result, of this backing out operation, the sheet is not turned over once again when it travels from portion 22-5 of the paper path back into portion 22-2. Side B which is the underside of the sheet as it travels along portion 22-5 of the paper path, remains the underside when it re-enters portion 22-2 of the paper path.

Summarizing, in the event duplex printing is not selected, the paper path may be described as follows:

21→22-1→22-2→22-3→25 with the paper being imprinted from below on Side A. In the event duplex printing is selected, the paper path is as follows:

21→22-1→22-2→22-4→22-5→22-6→22-7→22-2→2-2-3→25 with a "backing-out" operation occurring between portions 22-6 and 22-7 of the paper path, and with the paper being imprinted on both sides A and B.

It will be observed from this description, that the paper path schematically comprises a loop (22-2, 22-4, 22-5, and 22-7) with a number of branches (22-1, 22-3, and 22-6) extending from the loop. In particular, for duplex printing to take place, it is important that the paper follow a path comprising the loop 22-2, 22-4, 22-5, and 22-7, with a stop at the branch 22-6 for a backing out operation.

The operation of this printer involves only a single rotation of belt 10 per side imprinted. During this rotation, the belt is uniformly charged as it passes main charger 13. A latent image is generated by means of optical print head 15, which can be either a laser or an LED array. The optical print head serves to discharge selected portions of the uniformly charged photoconductive belt 10 as it move past the optical print head. The latent image thus formed is then developed by the deposition of toner particles from the developer unit 16. Illustratively, the toner is deposited only on the discharged portions of the photoconductive belt 10. The belt then enters the transfer region 25 wherein the developed image is transferred to the underside, which is either side A or side B, of the paper. In the transfer region 25, the transfer unit 19 serves to form an electric field which attracts the toner from the photoconductive belt 10 to the underside of the paper.

Having transferred the developed image to the underside of the paper, the photoconductive belt 10 must then be readied for imprinting the next copy or the other side of the sheet of paper if duplex printing has been selected by the operator. The photoconductive belt 10, continuing in the same revolution, is first cleaned by means of cleaning unit 9. The erase lamps 14 are then activated to uniformly discharge the photoconductive belt. Thus, as the belt rotates following image transfer, the excess toner is removed by the cleaning unit 9 and the belt is discharged by erase lamps 14. The belt is thereby readied to be charged again by main charger 13 for imprinting of the next copy or the other side of the sheet of paper.

As noted hereinabove, it is a feature of the present invention that the copy is always formed along the underside of the paper as it travels along paper path 22 through the transfer zone 25. This is accomplished by locating the photoconductive belt 10 below the straight portion 22-2 of the paper path. Thus, in the illustrative embodiment of FIG. 1, the transfer region 25 is located above roller 11 and the paper enters the region with its lower surface in contact with belt 10.

To avoid smudging the copy following image transfer, the printed paper is transported to the conventional fuser unit 23 by means of a vacuum transfer unit 24 whose only contact is with the upper side of the paper. This side either has no toner on it, or has already fused toner on it. The fuser unit 23 serves to fuse the toner to the underside paper by way of applying heat to the paper.

The cleaning unit 9 may comprise any of a number of conventional devices which have been used to remove residual toner particles from photoconductive members. Cleaning unit 9 may comprise, for example, a cleaning brush or a scraper blade. Preferably, cleaning unit 9 comprises an electrostatically charged cleaning device. Such devices are maintained at a suitable biasing voltage as a result of which they are able to attract toner particles from the photoconductive member. Most preferably, cleaning unit 9 comprises one of the electrostatic cleaning devices described in the co-pending applications entitled "DEVICE FOR REMOVING RESIDUAL DEVELOPER PARTICLES FROM A PHOTOCONDUCTIVE MEMBER" or "TONER CLEANING UNIT". These applications are assigned to the common assignee of the present application and are incorporated herein by reference. These applications are directed to cleaning units which can be suitably mounted on a photoconductive belt assembly such as that illustrated herein. In the embodiment illustrated in FIG. 1, cleaning unit 9 comprises the fur brush, roller, and scraper blade combination described in one of the aforementioned copending applications.

As a result of the use of a separate and independent cleaning unit, the electrographic printer described herein comprises a "one-pass" rather than a "two-pass" machine, i.e., one side of the sheet of paper is imprinted per revolution of the photoconductive belt. Thus, the output of the machine is effectively twice that of the electrographic printer disclosed in application Ser. No. 700,813. In actual practice, the electrographic printer described herein is capable of printing 24 sides per minute vs. 12 sheets per minute for the printer described in application Ser. No. 700,813.

The electrographic printer illustrated in FIG. 1 is a so-called "smart printer". That is, this electrographic printer contains an on-board controller which controls and coordinates each of the operations of its various components. The controller receives a variety of signals from various sensors and command stations associated with the printer and sends out a variety of signals in response thereto. Thus, the controller receives signals from various sensors to detect malfunctions in the printer and sends out signals to alert the operator to these malfunctions. The controller also interfaces with a computer terminal, as well as with a diskette drive 40 and hard disk drive 42, to control operation of the print head 15.

The on-board controller controls all of the operations of the printer such as the timing of the various components of the printer. It also detects when the operator has selected duplex printing and directs the paper transport mechanism to pass the sheet of paper into the duplex printing path.

Another important function of the controller is to reformat the light image projected by optical print head 15 onto photoconductive belt 10 when imprinting on the second side of the sheet of paper is about to occur. As described above, the sheet of paper passes through portion 22-2 of the paper path the first time with a leading edge in front. However, when the sheet of paper passes through portion 22-2 the second time for printing on its second side, it does so with its trailing edge in front. This is because of the "backing out" trailing edge in front. This is because of the "backing out" operation which occurs when the paper reenters the loop after stopping in branch 22-6. Unless the light image is reformatted by the controller, the printing on the second side of the sheet of paper will be reversed from that on the first side.

Assuming, for example, that the leading edge is the top of the sheet of paper which passes through transfer region 25 the first time, printing will occur from top to bottom on the sheet of paper. When the sheet of paper passes through transfer region 25 the next time for imprinting on its second side, it passes through with its bottom edge first. Thus, in order for information to be printed properly on the second side of the paper, the light image from optical print head 15 must be reformatted from bottom to top. This is accomplished by means of the controller when the controller detects that the duplex printing feature has been selected.

Figure 2:
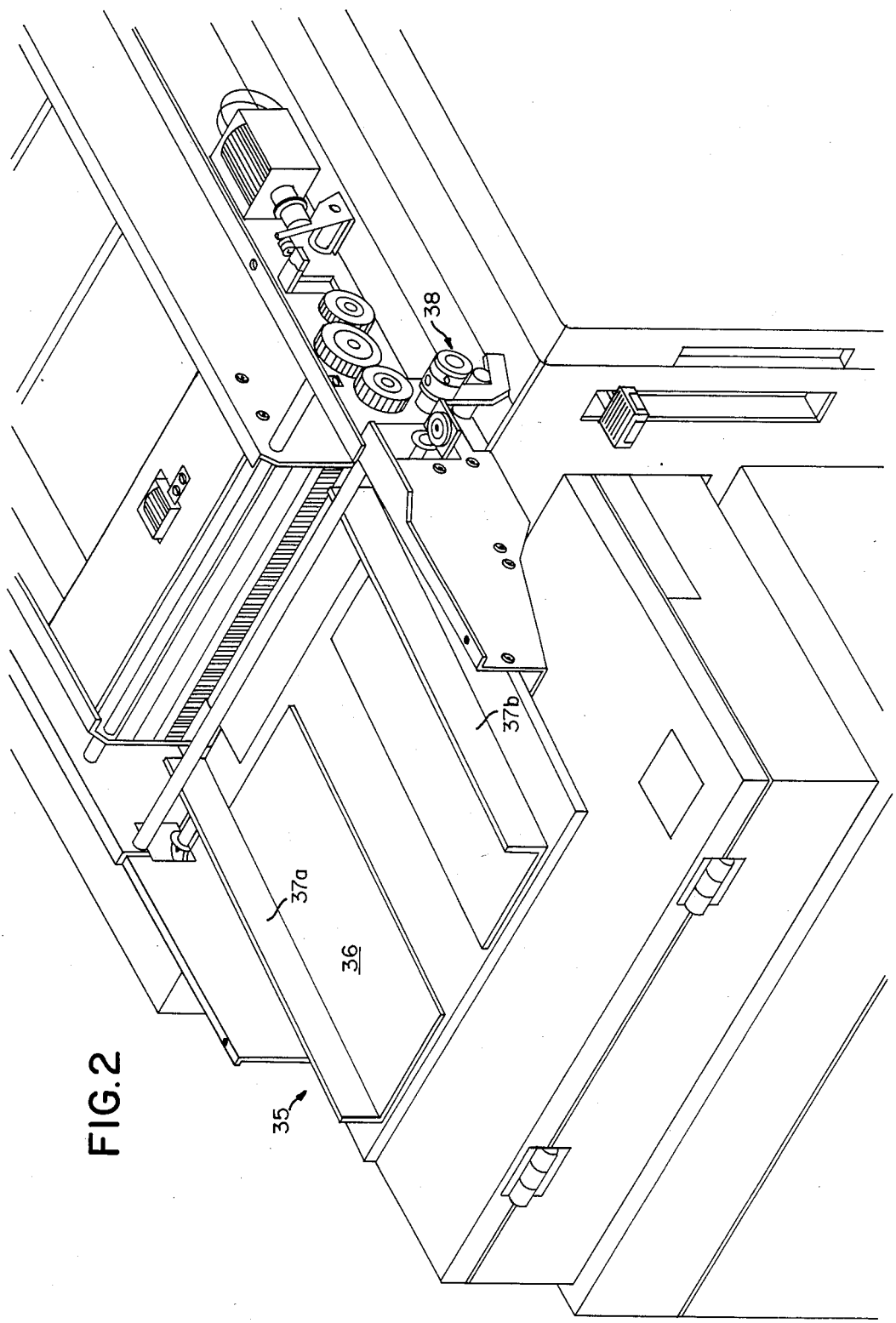
FIG. 2 is a perspective view of a portion of an actual electrographic printer of the present invention showing the paper skew correcting device attached.

Referring now to FIG. 2, a paper skew correcting 35 is shown mounted on an electrographic printer/copier of the present invention. Paper skew correcting device 35 comprises a bed 36 for receiving the paper and guide plates 37a and 37b. The guide plates 37a and 37b realign the paper when it is ejected onto bed 36. A gearing system 38 is also provided by means of which the distance between guide plates 37a and 37b are adjusted. Gearing system 38 is controlled by the on-board controller which adjusts the distance between the guide plates in response to formatting signals received by the computer. Alternatively, the controller may be interfaced with the input paper trays which have sensors to detect the width of the paper loaded into the trays. An example of such an input paper tray is described in application Ser. No. 718,945, filed Apr. 2, 1985, which is assigned to the present assignee and is incorporated herein by reference. The controller adjusts the distance between guide plates 37a and 37b in response to signals received from these sensors.

In addition, the on-board controller controls the paper rollers inside the electrographic printer to carry out the desired "backing-out" operation when the paper visits paper skew correcting device 35. Thus, the controller acts to ensure that the paper rollers turn in one direction to eject the paper onto bed 36 of paper skew correcting device 35, and then acts to reverse the rotational direction of the paper rollers so that the backing-out operation is performed.

Although the present invention has been described in terms of a smart printer, by inclusion of suitable optics, the present invention can be adapted to encompass a smart copier. Thus, with suitable optics, the controller can be instructed to reverse the reflected image so that duplex printing can occur in the case of an electrographic copier machine as well.

While the invention has been described by reference to specific embodiments, this was for purposes of illustration only and should not be construed to limit the spirit or the scope of the invention.

We claim:

1. An electrographic printing apparatus for producing hard copies of information to be recorded on two sides of a sheet of paper or the like, comprising
    a housing,
    a source of paper and an output receptacle for receiving said paper after it is imprinted,
    a first paper path along which said paper travels between said source and said output receptacle, said first paper path being substantially planar and located near a top of said housing,
    a photoconductive member for storing a latent electrostatic image of the information to be imprinted, said photoconductive member being located below said first paper path and coming into contact with a first side of said paper from below in a transfer zone located in said first paper path to imprint said first side of said paper, and
    a second paper path operative to receive said paper from said first paper path, to turn said paper over, and to return said paper to said first paper path at a location prior to said transfer zone so that a second side of said paper is imprinted from below, said second paper path also being located near the top of said housing.

2. The electrographic printing apparatus of claim 1 wherein said second paper path is operative to receive said paper from said first paper path after said paper has passed through said transfer zone and said latent electrostatic image has been transferred to said first side of said paper.

3. The electrographic printing apparatus of claim 1 wherein said second paper path is located above said first paper path adjacent the top of said housing.

4. The electrographic printing apparpatus of claim 1 further comprising an openable lid at the top of said housing, said first and second paper paths being accessible from above upon opening said lid.

5. The electrographic printing apparatus of claim 1 wherein said paper is in contact with said photoconductive member sustantially only in said transfer zone.

6. The electrographic printing apparatus of claim 1 further comprising alignment correction means located along said second paper path.

7. The electrographic printing apparatus of claim 1 further comprising a discharging unit for selectively discharging portions of said photoconductive member to form said latent electrostatic image.

8. The electrographic printing apparatus of claim 7 wherein said discharging unit comprises an optical print head.

9. The electrographic printing apparatus of claim 7 further comprising controller means for formatting the information to be imprinted on both sides of said paper.

10. The electrographic printing apparatus of claim 1 further comprising vacuum transport means located above said first paper path for transporting said paper from above.

11. The electrographic printing apparatus of claim 10 further comprising fusing means for fusing said information into said paper, said fusing means being located along said first paper path subsequent to said vacuum transport means.

12. The electrographic printing apparatus of claim 11 wherein said vacuum transport means and fusing means are located prior to said second paper path.

13. The electrographic printing apparatus of claim 1 further comprising a charging unit, a discharging unit, a developing unit, a transfer unit, a cleaning unit, and an erasing unit, each of said units being arranged in sequence about said photoconductive member.

14. The electrographic printing apparatus of claim 1 wherein said photoconductive member comprises a photoconductive belt.

15. The electrographic printing apparatus of claim 1 wherein said photoconductive member comprises a vertically mounted photoconductive belt.

16. The electrographic printing apparatus of claim 1 wherein said photoconductive member comprises a vertically mounted photoconductive belt in the form of a disposable cassette.

17. An electrographic printing apparatus for imprinting two sides of a sheet of paper or the like, comprising
    a source of paper and an output receptacle for receiving said paper after it is imprinted,
    a photoconductive member for storing an electrostatic image and for imprinting said paper,
    a paper path along which said paper travels between said source and said output receptacle, said paper path comprising a loop and a branch extending therefrom, said loop being of small curvature and being entirely located near a top of said housing and above said photoconductive member, and
    paper transport means for receiving said paper from said source, for passing said paper along said loop wherein said photoconductive member imprints a first side of said paper from below, for turning said paper over, for passing said paper into said branch, and for returning said paper to said loop a second time wherein said photoconductive member imprints a second side of said paper from below.

18. The electrographic printing apparatus of claim 17, wherein said loop receives said paper from said source with a leading edge in front and a trailing edge in back, and said loop receives said paper from said branch with said trailing edge in front and said leading edge in back.

19. The electrographic printing apparatus of claim 17, further comprisng a housing, said paper path being located near the top of said housing.

20. The electrographic printing apparatus of claim 17, further comprising alignment correction means located along said branch.

21. The electrographic printing apparatus of claim 17, wherein said branch is located near the top of said housing.

22. The electrographic printing apparatus of claim 17 further comprising an openable lid at the top of said housing, said branch being located near the top of said housing, said loop and branch being accessible from above upon opening said lid.

23. An electrographic printing apparatus for producing hard copies of information to be recorded on two sides of a sheet of paper or the like, comprising
 a housing,
 a source of paper and an output receptacle for receiving said paper after it is imprinted,
 a first paper path along which said paper travels between said source and said output receptacle,
 a photoconductive member for storing a latent electrostatic image of the information to be imprinted, said photoconductive member being located below said first paper path and coming into contact with a first side of said paper from below in a transfer zone located in said first paper path to imprint said first side of said paper,
 a second paper path operative to receive said paper from said first paper path, to turn said paper over, and to return said paper to said first paper path at a location prior to said transfer zone so that a second side of said paper is imprinted from below, and
 alignment correction means located along said second paper path.

24. An electrographic printing apparatus for producing hard copies of information to be recorded on two sides of a sheet of paper or the like, comprising
 a housing,
 a source of paper and an output receptacle for receiving said paper after it is imprinted,
 a first paper path along which said paper travels between said source and said output receptacle,
 a photoconductive member for storing a latent electrostatic image of the information to be imprinted, said photoconductive member being located below said first paper path and coming into contact with a first side of said paper from below in a transfer zone located in said first paper path to imprint said first side of said paper,
 a second paper path operative to receive said paper from said first paper path, to turn said paper over, and to return said paper to said first paper at a location prior to said transfer zone so that a second side of said paper is printed from below, and
 controller means for formatting the information to be imprinted on both sides of said paper.

25. An electrographic printing apparatus for producing hard copies of information to be recorded on two sides of a sheet of paper or the like, comprising
 a housing,
 a source of paper and an output receptacle for receiving said paper after it is imprinted,
 a first paper path along which said paper travels between said source and said output receptacle,
 a photoconductive member for storing a latent electrostatic image of the information to be imprinted, said photoconductive member being located below said first paper path and coming into contact with a first side of said paper from below in a transfer zone located in said first paper path to imprint said first side of said paper,
 a second paper path operative to receive said paper from said first paper path, to turn said paper over, and to return said paper to said first paper path at a location prior to said transfer zone so that a second side of said paper is imprinted from below, and
 vacuum transport means located above said first paper path for transporting said paper from above.

26. The electrographic printing apparatus of claim 25, further comprising fusing means for fusing said information into said paper, said fusing means being located along said first paper path subsequent to said vacuum transport means.

27. The electrographic printing apparatus of claim 26, wherein said vacuum transport means and fusing means are located prior to said second paper path.

* * * * *